United States Patent [19]
Reilly et al.

[11] Patent Number: 5,740,549
[45] Date of Patent: Apr. 14, 1998

[54] INFORMATION AND ADVERTISING DISTRIBUTION SYSTEM AND METHOD

[75] Inventors: James P. Reilly, San Francisco; Gregory P. Hassett, Cupertino, both of Calif.

[73] Assignee: PointCast, Inc., Sunnyvale, Calif.

[21] Appl. No.: 489,591

[22] Filed: Jun. 12, 1995

[51] Int. Cl.$^6$ .................................................. G06F 17/60
[52] U.S. Cl. .................................................. 705/14
[58] Field of Search ........................... 395/214, 200.09, 395/200.11, 200.15, 602, 604; 705/1, 14

[56] References Cited

U.S. PATENT DOCUMENTS

| | | | |
|---|---|---|---|
| 3,848,193 | 11/1974 | Martin et al. | 325/53 |
| 3,987,398 | 10/1976 | Fung | 325/309 |
| 4,170,782 | 10/1979 | Miller | 358/84 |
| 4,186,413 | 1/1980 | Mortimer | 358/146 |

(List continued on next page.)

FOREIGN PATENT DOCUMENTS

| | | |
|---|---|---|
| 0 113 022 A3 | 11/1983 | European Pat. Off. . |
| 96303727 | 8/1996 | European Pat. Off. . |
| 0 733 983 | 9/1996 | Germany ............ G06F 17/30 |
| 3204259 | 5/1991 | Japan . |

(List continued on next page.)

OTHER PUBLICATIONS

Doug Abrahms, "Patent Office May Hinder Hopping of Bunny Across Computer Screens", Washington Times, p. B7. Jun. 2, 1994.

G. M. O'Connell, "Turning On to Screen Savers", Promo, p. 97. Jun. 1994.

"PED Delivers Personalized Newspapers to Users Desktops", Electronic Information Report, v 15, n14. Apr. 15, 1994.

"Journalist—A New Prodigy Add–On", Newsbytes News Network. Apr. 5, 1994.

(List continued on next page.)

*Primary Examiner*—Gail O. Hayes
*Assistant Examiner*—William N. Hughet
*Attorney, Agent, or Firm*—Blakely, Sokoloff, Taylor & Zafman LLP

[57] ABSTRACT

In summary, the present invention is an information and advertising distribution system. A data server stores and updates a database of information items and advertisements. The information items and advertisements are each categorized so that each has an associated information category. Workstations remotely located from the data server each include a display device, a communication interface for receiving at least a subset of the information items and advertisements in the data server's database and local memory for storing the information items and advertisements received from the data server. An information administrator in each workstation establishes communication with the data server from time to time so as to update the information items and advertisements stored in local memory with at least a subset of the information items and advertisements stored by the data server. An information display controller in each workstation displays on the workstation's display device at least a subset of the information items and advertisements stored in local memory when the workstation meets predefined idleness criteria. At least a subset of the workstations include a profiler for storing subscriber profile data. The subscriber profile data represents subscriber information viewing preferences, indicating information categories for which the subscriber does and does not want to view information items. The information display controller includes a filter for excluding from the information items displayed on the display device those information items inconsistent with the subscriber profile data.

20 Claims, 10 Drawing Sheets

U.S. PATENT DOCUMENTS

| | | | |
|---|---|---|---|
| 4,224,644 | 9/1980 | Lewis et al. | 360/72.2 |
| 4,287,592 | 9/1981 | Paulish et al. | 370/88 |
| 4,288,809 | 9/1981 | Yabe | 358/12 |
| 4,305,101 | 12/1981 | Yarbrough et al. | 360/69 |
| 4,307,446 | 12/1981 | Barton et al. | 364/200 |
| 4,338,644 | 7/1982 | Staar | 360/132 |
| 4,347,498 | 8/1982 | Lee et al. | 340/825.02 |
| 4,381,522 | 4/1983 | Lambert | 358/86 |
| 4,405,946 | 9/1983 | Knight | 358/192.1 |
| 4,429,385 | 1/1984 | Cichelli et al. | 370/92 |
| 4,476,488 | 10/1984 | Merrell | 358/86 |
| 4,488,179 | 12/1984 | Kruger et al. | 358/181 |
| 4,536,791 | 8/1985 | Campbell et al. | 358/122 |
| 4,575,579 | 3/1986 | Simon et al. | 178/4 |
| 4,641,205 | 2/1987 | Beyers, Jr. | 360/33.1 |
| 4,677,466 | 6/1987 | Lert, Jr. et al. | 358/84 |
| 4,691,351 | 9/1987 | Hayashi et al. | 380/10 |
| 4,691,354 | 9/1987 | Palminteri | 380/15 |
| 4,701,794 | 10/1987 | Froling et al. | 358/147 |
| 4,706,121 | 11/1987 | Young | 358/142 |
| 4,751,578 | 6/1988 | Reiter et al. | 358/183 |
| 4,751,669 | 6/1988 | Sturgis et al. | 364/900 |
| 4,768,110 | 8/1988 | Dunlap et al. | 360/33.1 |
| 4,775,935 | 10/1988 | Yourick | 364/101 |
| 4,815,030 | 3/1989 | Cross et al. | 364/900 |
| 4,821,102 | 4/1989 | Ichikawa et al. | 358/183 |
| 4,823,122 | 4/1989 | Mann et al. | 340/825.28 |
| 4,829,569 | 5/1989 | Seth-Smith et al. | 380/10 |
| 4,866,700 | 9/1989 | Seth-Smith et al. | 380/20 |
| 4,868,866 | 9/1989 | Williams, Jr. | 380/49 |
| 4,873,662 | 10/1989 | Sargent | 364/900 |
| 4,890,321 | 12/1989 | Seth-Smith et al. | 380/20 |
| 4,908,707 | 3/1990 | Kinghorn | 358/147 |
| 4,908,713 | 3/1990 | Levine | 358/335 |
| 4,974,149 | 11/1990 | Valenti | 364/200 |
| 4,975,904 | 12/1990 | Mann et al. | 370/85.1 |
| 4,975,905 | 12/1990 | Mann et al. | 370/85.1 |
| 4,977,455 | 12/1990 | Young | 358/142 |
| 4,987,486 | 1/1991 | Johnson et al. | 358/86 |
| 4,991,011 | 2/1991 | Johnson et al. | 358/141 |
| 4,994,908 | 2/1991 | Kuban et al. | 358/68 |
| 5,001,554 | 3/1991 | Johnson et al. | 358/86 |
| 5,008,853 | 4/1991 | Bly et al. | 364/900 |
| 5,053,889 | 10/1991 | Johnson | 358/349 |
| 5,058,108 | 10/1991 | Mann et al. | 370/85.1 |
| 5,075,771 | 12/1991 | Hashimoto | 358/84 |
| 5,077,607 | 12/1991 | Johnson et al. | 358/86 |
| 5,099,319 | 3/1992 | Esch et al. | 358/86 |
| 5,105,184 | 4/1992 | Pirani et al. | 340/721 |
| 5,133,075 | 7/1992 | Risch | 395/800 |
| 5,151,789 | 9/1992 | Young | 385/194.1 |
| 5,182,640 | 1/1993 | Takano | 358/86 |
| 5,187,787 | 2/1993 | Skeen et al. | 395/600 |
| 5,200,823 | 4/1993 | Yoneda et al. | 358/146 |
| 5,220,420 | 6/1993 | Hoarty et al. | 358/86 |
| 5,220,657 | 6/1993 | Bly et al. | 395/425 |
| 5,230,048 | 7/1993 | Moy | 395/600 |
| 5,231,493 | 7/1993 | Apitz | 358/146 |
| 5,261,042 | 11/1993 | Brandt | 395/156 |
| 5,283,639 | 2/1994 | Esch et al. | 348/6 |
| 5,283,731 | 2/1994 | Lalonde | 364/401 |
| 5,285,272 | 2/1994 | Bradley et al. | 348/6 |
| 5,301,028 | 4/1994 | Banker et al. | 348/570 |
| 5,305,195 | 4/1994 | Murphy | 364/401 |
| 5,319,707 | 6/1994 | Wasilewski et al. | 380/14 |
| 5,337,155 | 8/1994 | Cornelis | 348/473 |
| 5,339,239 | 8/1994 | Manabe et al. | 364/401 |
| 5,343,300 | 8/1994 | Hennig | 348/478 |
| 5,345,594 | 9/1994 | Tsuda | 455/18 |
| 5,347,632 | 9/1994 | Filepp et al. | 395/200 |
| 5,355,480 | 10/1994 | Smith et al. | 395/600 |
| 5,357,276 | 10/1994 | Banker et al. | 348/7 |
| 5,404,505 | 4/1995 | Levinson | 395/600 |
| 5,440,262 | 8/1995 | Lee et al. | 345/212 |
| 5,471,629 | 11/1995 | Risch | 395/800 |
| 5,498,003 | 3/1996 | Gechter | 273/434 |
| 5,511,160 | 4/1996 | Robson | 395/162 |
| 5,515,098 | 5/1996 | Carles | 348/8 |
| 5,528,490 | 6/1996 | Hill | 364/403 |
| 5,537,586 | 7/1996 | Amram et al. | 395/600 |
| 5,557,721 | 9/1996 | Fite et al. | 395/148 |
| 5,577,266 | 11/1996 | Takahisa et al. | 455/66 |
| 5,579,537 | 11/1996 | Takahisa | 455/66 |
| 5,583,563 | 12/1996 | Wanderscheid et al. | 348/13 |
| 5,600,366 | 2/1997 | Schulman | 348/9 |
| 5,617,565 | 4/1997 | Augenbraun et al. | 395/604 |

FOREIGN PATENT DOCUMENTS

| | | |
|---|---|---|
| A 3204259 | 5/1991 | Japan. |
| 4250591 | 7/1992 | Japan. |
| A4250591 | 9/1992 | Japan. |
| 6314184 | 8/1994 | Japan. |
| 2 034 995 | 6/1980 | United Kingdom. |
| 2 141 907 | 1/1985 | United Kingdom. |
| 2 185 670 | 7/1987 | United Kingdom. |
| 2 207 314 | 1/1989 | United Kingdom. |
| 2 256 549 | 12/1992 | United Kingdom. |
| 2 281 434 | 8/1994 | United Kingdom. |
| 2 281 434 | 3/1995 | United Kingdom. |
| WO 88/04507 | 6/1988 | WIPO. |
| WO 90/07844 | 7/1990 | WIPO. |
| 9212488 | 12/1990 | WIPO. |
| WO 93/09631 | 5/1993 | WIPO. |
| WO 93/19427 | 9/1993 | WIPO. |
| WO93/19427 | 9/1993 | WIPO. |
| 9630864 | 3/1994 | WIPO. |
| WO 95/31069 | 11/1995 | WIPO. |
| WO 96/34466 | 10/1996 | WIPO. |
| WO 96/36141 | 11/1996 | WIPO. |

OTHER PUBLICATIONS

John R. Quain, "Journalist Delivers Your Own Personalized Newspaper", PC Magazine, v 12, n 17, p. 49. Oct. 12, 1993.

Richard Lander, "UK: Home Computer—From Your Own Correspondent", Independent, p. 15. Sep. 24, 1993.

Mary Kathleen Flynn, The Daily Me: Laying Out Tomorrow's (Electronic) News, PC Magazine, v 12 n 5, p. 29. Sep. 14, 1993.

CorelDRAW User's Manual—Version 4.0, Corel Corporation 1993.

Tom Inglesby, "Rightsizing the Enterprise", Manufacturing Systems Supplement, pp. 6–10. Oct. 1992.

"Prodigy", Prodigy Services Company 1989.

"Innovation That Has a Purpose is Called Key to Technology Success", Marketing News, v 22, n 6, pp. 37 & 40. Mar. 14, 1988.

"Microsoft Picks On–Line News From PointCast", David Bank, The Wall Street Journal, 1 p. Dec. 12, 1996.

"Microsoft And PointCast In Broadcast Alliance", The New York Times, Laurence Zuckerman, 1 p., Dec. 12, 1996.

"Microsoft Unites With PointCast at Trade Show", The San Francisco Chronicle, Jean Sheartz, 1 p., Dec. 12, 1996.

"Microsoft Teams With PointCast", The Globe And Mail, Patrick Bretmour, 1 p., Dec. 12, 1996.

"Microsoft Cuts Deals With 2 Firms", San Jose Mercury News, 1 p., Dec. 12, 1996.

"Microsoft To Expand its Internet Reach", Los Angeles Times, 1 p., Dec. 12, 1996.

"PointCast to team With Microsoft, add new Net dimension", Contra Costa Times, George Avalos, 2 pp. Dec. 12, 1996.

"Intercast Brings the Web to TV", PC Tech/Internet Tools, PC Magazine, Brian Proffit, 2 pp., Jan. 21, 1997.

"Tele–Briefs A Novel User–Selectable Real Time News Headline Service For Cable TV", Ralph H. Baer, IEEE Transactions on Consumer Electronics, vol. CE–25, No. 3, Jul. 1979, 3 pages.

"Synchronization of Multimedia Data For A Multimedia News–On–Demand Application", Louise Lamont, et al., IEEE Journal On Selected Areas In Communications, vol. 14, No. 1, Jan. 1996, pp. 264–278.

"News to the desktop", John Evan Frook, Interactive Age, 3 pp., Apr. 29, 1996.

"PointCast Network", 1 p., Netguide, Sep. 1996.

"A Need–To–Know Basis", 1 p., WebMaster, Oct. 1996.

"Big Business at Businesswire.Com", Christopher Elliott, Web Techniques, Dec. 1996, pp. 95–99.

"Better Internet Access With WinVN", James M. Dumoulin, p. 14, AeroSpace Technology Innovation.

"A new generation of NNTP servers provides a vehicle for enhanced collaboration", Amarendra Singh, PC Magazine, Jan. 21, 1997, pp. 183–190.

"And Now The News—On Your PC Screen", Newsbytes News Network, Oct. 16, 1995, Grant Buckler 1 page.

"Globe Information To Market NewsEdge In Canada", Grant Buckler, Newsbytes News Network, 1 page., May 26, 1992.

"Oracle's Vision of Networked Future", Martyn Williams, 2 pages, Newsbytes News Network, Oct. 5, 1995.

"Monitoring Databases Objects", Tore Risch, pp. 445–453, Proceedings Of The Fifteenth International Conference On Very Large Data Bases, Aug. 1989.

Isis Documentation: Release 1 (Jul., 1987).

The ISIS System Manual (Mar. 15, 1988).

Birman, K., and Joseph, T., "Exploiting Virtual Synchrony in Distributed Systems", Proceedings of the Eleventh ACM Symposium on Operating System Principles, (Nov. 1987).

Schroeder, Birrell and Needham, Experiences with Grapevine: The growth of a distributed system, ACM Trans. on Computer Systems, vol. 2, No. 1 (Feb. 1984, 3–23).

CCITT Standard X.208.

CCITT Standard X.209.

Birman and Marzullo, "Isis and the Meta Project", Sun Technology, Summer, 1989.

"Affidavit in Support of Lead Case Plaintiff's Motion for Partial Summary Judgment", By Fred B. Schneider, Nov. 4, 1993.

"VCR Technology: No. 4 in a series of reports from Mitsubishi R&D", Video Review, Jan. 1989.

Bensch, U., "VPV—Videotext Programs Videorecorder", 1988 IEEE, pp. 788–792.

IBM Technical Disclosure Bulletin, vol. 28, No. 5, Oct. 1985.

James, A., "ORACLE—Broadcasting the Written Word", Wireless World, Jul., 1973, pp. 314–316.

McKenzie, G.A., "ORACLE—An Information Broadcasting Service Using Data Transmission in the Vertical Interval", Journal of the SMPTE, Jan. 1974, vol. 83, No. 1, pp. 6–10.

Green, N.W., "ORACLE—The Problems of Implementing a Teletext System On Independent Television and Their Solution", Colloquim on Broadcast and Wired Teletext Systems—Ceefax, ORACLE, VIEWDATA Organized by Professiona Group E14, Jan. 13, 1976, Digest No. 197613.

Robinson, G., et al., "'Touch–Tone' Teletext, A Combined Teletext–Viewdata System", IEEE Transactions on Consumer Electronics, vol. CE25, No. 3, Jul. 1979, pp. 299–303.

Crowther, G.O., "Teletext and Viewdata Systems and Their Possible Extension to Europe and USA", IEEE Transactions On Consumer Electronics, vol. CE25, No. 3, Jul. 1979, pp. 288–294.

Roizen, J., "Teletext in the USA", Journal of the SMPTE, Jul. 1981, pp. 602–610.

Gecsei, J., The Architecture of Videotex Systems, 1983, pp. 174–177; 233–238.

Chapter 10: Viewdata, pp. 112–123.

System as described in DIP II ad.

System as described in Cable Data ad.

"Monitoring Corporate Information With FirstFloor Products", World Wide Web, Nov. 30, 1996.

Apers, P.M.G. and Widerhold, G. (eds.), Proceedings of the Fifteenth International Conference on Very Large Databases, Aug. 22–25, 1989, Amsterdam, The Netherlands.

Diaz, O., et al., "Rule Management in Object Oriented Databases: A Uniform Approach", Proceedings of the Seventeen International Conference on Very Large Databases, Barcelona, Spain, Sep., 1991.

PED Software Corporation, *Journalist Quick Start*, pp. 1–4, U.S.A.

Prodigy Interactive Personal Service, *Journalist for a Window on a New World of News*, pp. 1–4, Cupertino, CA, U.S.A.

CompuServe Brochure, pp. 1–4, Cupertino, CA, U.S.A.

PED Software Corporation, *Journalist™ User's Guide, Your Personalized Newspaper for CompuServe*, 1994, pp. 1–143, Cupertino, CA, U.S.A.

PED Software Corporation, *Journalist™ User's Guide, Your Personalized Newspaper for the Prodigy Service*, 1994, pp. 1–141, San Jose, CA, U.S.A.

Kass, Andrew Jonathan, *An Interchange Standard and System for Browsing Digital Documents*, M.I.T., May 1995, pp. 1–105, U.S.A.

InterTect. Ltd., *Hyper Texxt Newzzz*, Mar. 1996, pp. 1–20, Philadelphia, Pennsylvania, U.S.A.

Hoffert et al., "The Digital News System and EDUCOM: A Convergence of Interactive Computing, Newspapers, Television and High–Speed Networks", *Communincations of the ACM*, vol. 34, No. 4, Apr. 1991, pp. 113–116.

Miller et al., "News On–Demand for Multimedia Networks", *ACM Multimedia 93*.

Jackson et al., "InterMail: A Prototype Hypermedia Mail System", *Hypertext '91 Proceedings*, Dec. 1991, pp. 405–409.

Richard L. Phillips, "MediaView: A General Multimedia Digital Publication System", *Commuications of the ACM*, vol. 34, No. 7, Jul. 1991, pp. 75–83.

Forsdick et al., "Initial Experience with Multimedia Documents in Diamond", *Computer–Based Message Services*, H.T. Smith (Editor), Elsevier Science Publishers B.V. (North–Holland), 1984, pp. 99–113.

Bulterman et al., "A Structure for Transportable, Dynamic Multimedia Documents", *USENIX*, Summer 1991, Nashville, TN, pp. 137–154.

"PC Meets TV: The Plot Thickens", *Business Week*, Dec. 23, 1996, pp. 94–95.

Nathaniel S. Borenstein, "Multimedia Electronic Mail: Will the Dream Become a Reality?", *Communications of the ACM*, vol. 34, No. 4, Apr. 1991, pp. 117–119.

Yan et al., "SIFT—A Tool for Wide–Area Information Dissemination", *1995 USENIX Technical Conference*, Jan. 16–20, 1995, New Orleans, LA, pp. 177–186.

Huang et al., "Multimedia E–mail: the Evolution Approach Based on Adaptors", *Software—Practice and Experience*, vol. 24, No. 9, Sep. 1994, pp. 785–800.

Richard L. Phillips, "An Interpersonal Multimedia Visualization System", *IEEE Computer Graphics & Applications*, May 1991, pp. 20–27.

Ramanathan et al., "Architectures for Personalized Multimedia", *IEEE Multimedia*, Spring 1994, pp. 37–46.

Postel et al., "The ISI Experimental Multimedia Mail System", *ISI Research Report*, ISI/RR–86–173, Sep. 1986.

Ramanathan et al., "Towards Personalized Multimedia Dial–up Services", *Computer Networks and ISDN Systems*, Elsevier Science B.V., 1994, pp. 1305–1322.

Andreas Dieberger, "Browsing the WWW by Interacting with a Textual Virtual Environment—A Framework for Experimenting with Navigational Metaphors", *Hypertext '96*, Washington, D.C., 1996, pp. 170–179.

Story et al., "The RightPages, Image–Based Electronic Library for Alerting and Browsing", *Computer*, Sep. 1992, pp. 17–26.

"First Looks", *PC Magazine*, Jan. 7, 1997, p. 60.

Richard Overton, "PointCast 1.1: More Content for News Junkies", *PC World*, Jan. 1997, p. 102.

Gabrielle Mitchell, "Two Free Programs Deliver News to Your PC", *PC World*, Aug. 1996, p. 76.

Jesse Berst, "'Pugh' Products Redefine Internet", *PC Week*, Nov. 25, 1996, p. 63.

Barrie et al., "The World Wide Web as an Instructional Tool", *Science*, vol. 274, Oct. 18, 1996, pp. 371–372.

Laurence Zuckerman, "Pushing the Envelope on Delivery of Customized Internet", *New York Times*, Dec. 9, 1996, Section D5.

Cooperstock et al., "Why Use a Fishing Line When You Have a Net? An Adaptive Multicast Data Distribution Protocol", *1996 USENIX Technical Conference*, Jan. 22–26, 1996, San Diego, CA, pp. 343–352.

Heiko Thimm, "A Multimedia Enhanced CSCW Teleservice for Wide Are Cooperative Authoring of Multimedia Documents", *SIGOIS Bulletin*, vol. 15, No. 2, Dec. 1994, pp. 49–57.

David Bank, "Inverted Web: How Net is Becoming More Like Television to Draw Advertisers", *The Wall Street Journal*, Friday, Dec. 13, 1996.

Alekperov V P et al., "An adaptation method for SDI", Nauchno–Tekh Inf. 2 (USSR), Nauchno–Tekhnicheskaya Informatsiya, Seriya 2, 1973, USSR (Abstract only).

Joanna Bean, "Colorado–Based Startup Uses Computer Screen Savers for Marketing", The GazetteTelegraph, Feb. 22, 1994.

Donald T. Hawkins, "Electronic Advertising on Online Information Systems", Online v. 18, n 2, pp. 26–39, Mar. 1994.

INFORMATION AND ADVERTISING DISTRIBUTION SYSTEM AND METHOD

The present invention relates generally to computer based information distribution systems, and particularly to a system for distributing to a set of subscribers' computers information matching each subscriber's interests as well as advertising, and for distributing the information and advertising to each subscriber's computer during time periods in which the subscriber's computer is otherwise inactive.

BACKGROUND OF THE INVENTION

The use of advertising revenues to pay for information dissemination is well established in domains such as television and radio in which end users are tuned to a continuous signal over a lengthy period of time. In such systems, due to the continuous nature of the signal being monitored by the end users, the end users are sufficiently similar to a "captive audience" that many or most end users remain tuned to the same signal even when the main program to which they are listening or viewing is interrupted by advertisements.

Another example of advertising mixed with information dissemination is the use of scrolled text at the bottom of a television of computer screen, where the main program occupies most of the end user's visual field and a smaller portion is occupied by advertisements and the like on a "scroll bar" or similar visual device along the periphery of the screen. In some contexts, such as cable television channels that display a "stock ticker tape," this relationship is reversed: the information portion of the screen occupies a small part of the screen, such as horizontally scrolling image region at the top or bottom of the display and the remainder of the screen is occupied by advertisements, "infomercials" and the like.

Yet another example of mixing advertisements with information dissemination are newspapers and magazines.

Most, and perhaps all such examples of mixing advertisements with information content are based on systems in which the end user has actively elected to view or listen to a program or to otherwise receive information. Furthermore, in virtually all such systems or media, the juxtaposition or placement of advertisements and information content is explicitly programmed or determined by human beings working as "editors" or in a similar content and/or presentation editing capacity.

Up until the present, distributing information via the Internet or other publicly accessible computer communication networks has been largely unsupported by advertising revenues due to the lack of good mechanisms for mixing advertising and information content in such a way as to be acceptable to both end users and advertisers. There are, of course, some exceptions where advertising/content mixtures from other contexts, such as newspapers and television, have been simply replicated on the Internet. For instance, some newspapers have been "published" at least in part on the Internet, and include advertisements along with information content. In fact, some newspapers sell advertising space on an associated World Wide Web (WWW) site, which often includes extensive listings of certain types of advertisements such as real estate advertisements, personal advertisements, and so on. Similarly, the scroll bar type advertisement at the bottom of a computer screen is based on similar advertising techniques used in cable television and other television contexts.

There are also examples of computer programs which contain advertisements. In all such examples known to the inventors, the advertisements are either permanently embedded in the computer programs or reside permanently with computer programs such that they cannot be easily updated.

The present invention addresses a problem prevalent in electronic information distribution systems. In particular, "on line" newspapers and magazines are notoriously difficult and tedious to read. Graphics and animation and full motion video, all techniques widely used in television news programs, require substantial data transmission bandwidth. Such data transmission is expensive both in terms of communications bandwidth (capacity) and time. In non-computer publishing such as printed magazines and newspapers, graphics are often used to make reading less difficult and tedious. In television the majority of information is delivered with movement (animation), although graphics are also often used.

The use of large bandwidth data transmissions is not economically practical in the context of data dissemination via the Internet and other computer networks, although the cost of such data transmissions will undoubtedly continue to decrease. As a result, graphics and animation have typically received relatively little use in computer network based information dissemination systems.

The present invention mixes advertising and information content dissemination in a manner unlike the examples mentioned above.

It is a goal of the present invention to disseminate information and advertisements to subscribers' computers in a system where the information and advertisements are automatically displayed when the subscriber's computer is on but meets predefined idleness criteria. For example, the predefined idleness criteria could be the failure to receive any input for a period of at least five minutes.

Another goal of the present invention is to automatically update each subscriber's local database of news stories at least once per day, and preferably multiple times per day so as to present subscribers with timely information.

Another goal of the present invention is present news stories and advertisements in a dynamic and easy to read manner.

Another goal of the present invention is to categorize news stories and advertisements, and to display advertisements associated with each category at the same time that new stories associated with same category are displayed, thereby providing a "targeted" audience for advertisers.

Another goal of the present invention is provide each subscriber with the ability to set up and change a user profile indicating categories and subcategories of topics which are of interest and not of interest to the subscriber, and to select the news stories displayed on the subscriber's computer accordingly.

Yet another goal of the present invention is to divide news stories into at least two portions, a preliminary portion and a secondary portion, where the preliminary portions of news stories are automatically displayed during idle periods, and the secondary portions are displayed only upon subscriber request.

SUMMARY OF THE INVENTION

In summary, the present invention is an information and advertising distribution system. A information server stores and updates a database of information items and advertisements. The information items and advertisements are each categorized so that each has an associated information category. Workstations remotely located from the information server each include a display device, a communication interface for receiving at least a subset of the information items and advertisements in the information server's database and local memory for storing the information items and advertisements received from the information server. An information administrator in each workstation establishes communication with the information server from time to time so as to update the information items and advertisements stored in local memory with at least a subset of the information items and advertisements stored by the information server. An information display controller in each workstation displays on the workstation's display device at least a subset of the information items and advertisements stored in local memory when the workstation meets predefined idleness criteria.

At least a some of the workstations include a profiler for storing subscriber profile data. The subscriber profile data represents subscriber information viewing preferences, indicating information categories for which a subscriber associated with the workstation does and does not want to view information items. The information display controller includes a filter for excluding from the information items displayed on the display device those information items inconsistent with the subscriber profile data.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
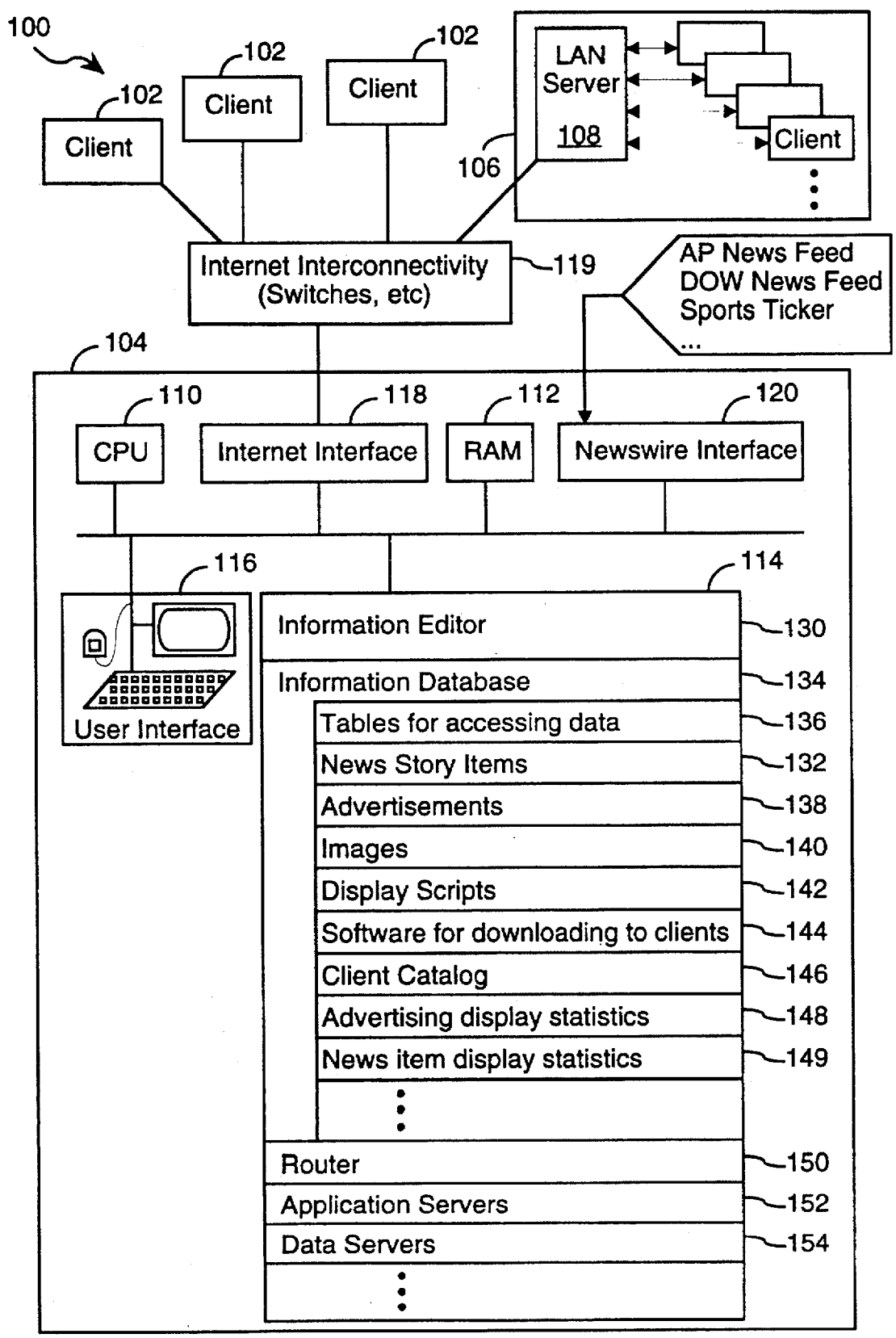
FIG. 1 is a block diagram of an information and advertising distribution system in accordance with the present invention.

Referring to FIG. 1, there is shown a computer based information and advertising distribution system 100 having many client computers 102 and at least one information server computer 104. Client computers are often called "subscribers' computers" in the present document, and the terms "subscriber computer" and "client computer" will be used synonymously. In many instances, a set of subscribers 102 will be located within a common local area network (LAN) 106, and are connected to a LAN server 108.

In the preferred embodiment, each subscriber's computer 102 is connected to the information server 104 via the Internet 119 for a small fraction of each day. Other forms of electronic communication connections, including private wide area networks similar to CompuServe, America OnLine or Prodigy, can be used to connect subscribers' computers to the information server 104 in alternate embodiments of the invention.

While most client computers are desktop computers, such as IBM compatible computers and Macintosh computers, virtually any type of computer can be a client computer so long as it can support the "screen saver" mode of operation of the preferred embodiment.

Information Server

The information server 104 includes a central processing unit 110, primary memory 112 (i.e., fast random access memory) and secondary memory 114 (typically disk storage), a user interface 116, an Internet interface 118 for communication with the client computers 102 via the Internet 119, and one or more news wire interfaces 120 for receiving news feeds from information transmission services such as the AP news feed, the DOW news feed and various sports news feeds. An information editor 130 is used, typically under the direction of a person using the user interface 116, to select news stories received from the new feeds and to edit and format the news stories into a form suitable to dissemination to subscribers' computers using the present invention. The selected and edited news stories 132 are stored in an information database 134 in the information server 104.

In the preferred embodiment, the information editor 130 is used to assign each news story to an information category and, where appropriate, to also assign the news story to one or more sub-categories. The information editor maintains a list of the currently defined categories and sub-categories. The category list can be updated by the personnel operating the information server, typically to add and delete special new categories associated with major news events such as a famous trial or event which generates many news stories. The category to which each news story is assigned is represented in one or more Data Access Tables 136.

The information editor 130 is also used to divide most news stories into two components or portions: a primary component or portion and a secondary component or portion. The primary component is what is displayed on a subscriber's workstation when the subscriber's workstation is turned on but has been idle, while the secondary component is what is displayed, along with the primary components only upon a subscriber's request. For instance, as will be described below, there are number of ways in which a subscriber can request the display of the "full text" of a news item (which may include photographs and the like). For convenience, the primary component of each news story is sometimes herein called the "headline", even though it will often contain more information than just the headline of the news item, and the secondary component of each news story will sometimes be called the "body."

Advertisements 138 are also stored in the information database 134 and each advertisement is assigned to at least one of the predefined information categories. Each advertisement is displayed on subscribers' workstations simultaneously with news items assigned to the same category as the advertisement. When an advertisement is assigned to multiple categories, it is treated in most respects as several advertisements each assigned to one category, except that only one copy of the advertisement is actually stored.

Next, the information database in the server computer includes a set of images 140 used during the display of news items and advertisements. For instance, different "wallpaper" or background images may be useful when displaying news items in various types of information categories. As an example, the images 140 include three fixed images for indicating that the stock market has risen, fallen or stayed largely unchanged. Then, depending on what has happened to the stock market on any particular day, information concerning the amount of change in the stock market during the relevant time period, and sometimes other associated information, is superimposed on a selected one of those fixed images. Other images stored in the information database include various "actors" that can be moved around the display with the news items when the system is in screen saver mode.

The information database 134 also stores a set of "display scripts" 142. A script controls the display of news items and advertisements, typically displaying a selected number of news items and one advertisement for a period of 30 seconds. A script determines the number of news items displayed, determines the positions of the news items and advertisement on the display, determines any movement of the news items around the displayed image, and determines what background image or images are displayed in conjunction with the news items.

An important concept associated with the present invention is that constantly varying the presentation of news items and advertisements, through the use of a rotating set of scripts, makes it easier for subscribers to read the news headlines and advertisements being presented. In a preferred embodiment, at least two distinct scripts, and preferably three or more distinct scripts are provided for most information categories, with a total of at least ten different scripts being used. Most scripts can be used with multiple categories of news items. The procedure for defining display scripts and the associated data structure are described below with reference to FIG. 7A.

The information database 134 also stores software modules 144 for downloading to subscribers' computers. The information administration management procedures and information viewing procedures in subscribers' computers will need updating and upgrading from time to time. The new versions of these software procedures are stored in the information server's information database 134 for downloading into the computers of subscribers at the same time that the information items or advertisements in the subscriber computers' information database 184 is updated. Since numerous types of subscriber computers are supported, the server's information database 134 will typically store a set of updated software modules for each of the supported types of computers.

Finally, the information database 134 includes advertising display statistics 148 and news item display statistics 149. The display statistics are collected from the subscribers' computers when the subscribers' computers call in for updated news stories and the like. Advertising display statistics indicate how many times each advertisement has been displayed on subscribers' computers. In a preferred embodiment, display statistics for each advertisement are divided into a display count for displaying during data viewer usage, a display count for other display instances, and an indication of each advertisement the user has interacted with, such as by "clicking" on the advertisement to connect to the advertiser's World Wide Web page. News item display statistics 149 concern how much time the subscriber spent viewing each non-advertising item in the data viewer as well as the amount of time the screen saver was active for each information category.

Other procedures stored in the information server's secondary memory are a router procedure 150, application server procedures 152, and data server procedures 154. The utility of these procedures is explained below with reference to FIGS. 8 and 9.

Subscriber's Workstation

Figure 2:
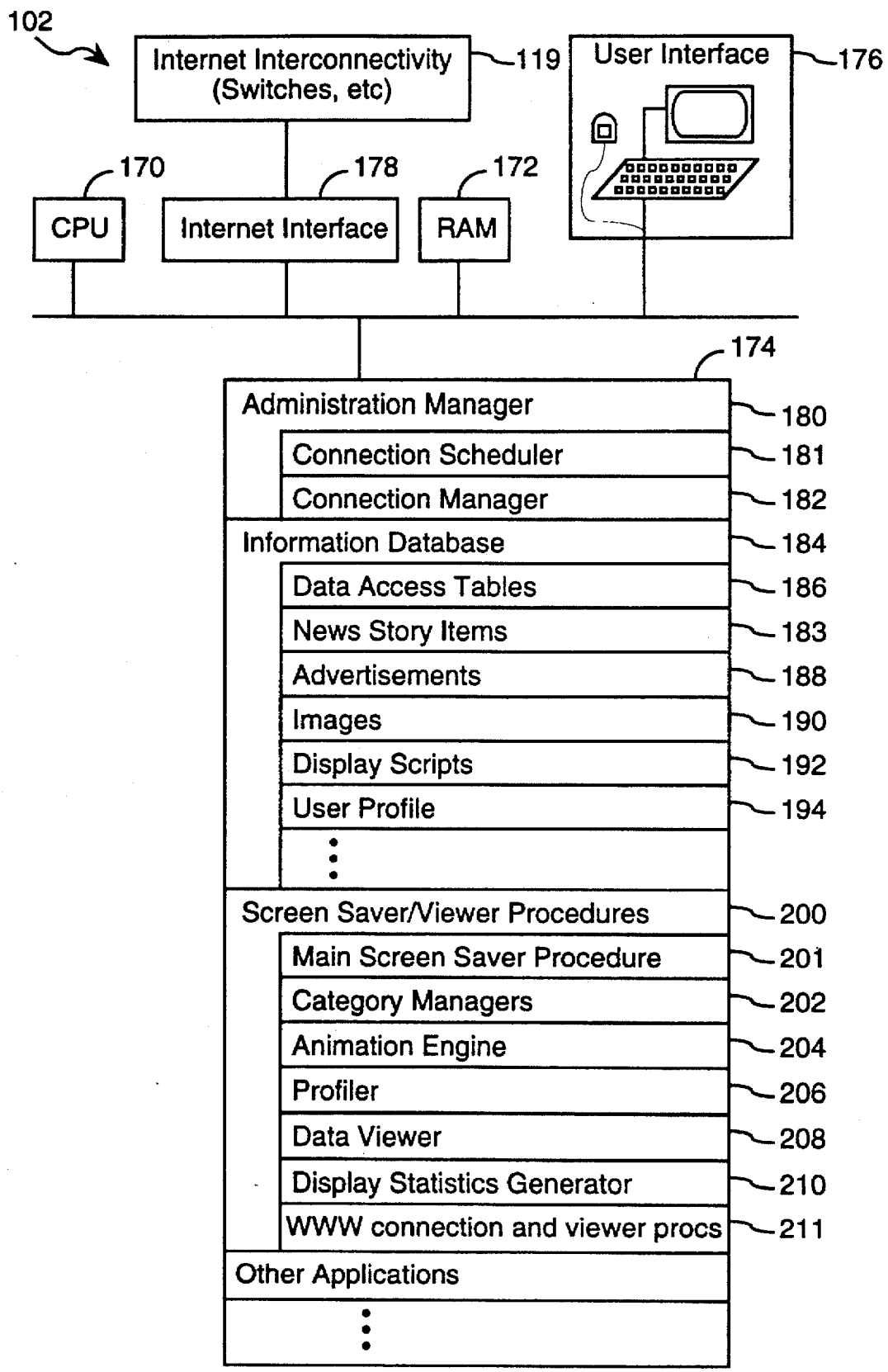
FIG. 2 is a block diagram of a subscriber's computer in the information and advertising distribution system of FIG. 1.

FIG. 2 is a schematic representation of the subscriber's workstation or computer 102 that is not connected to the information server 104 via a LAN server. For subscribers' workstations connected to the information server 104 via a LAN server 108, FIG. 2 is representative of the LAN server, but the display device used by each such subscriber's computer to view news items and advertisements is part of the subscriber's workstation rather than the LAN server 108.

The subscriber workstation 102 includes a central processing unit 170, primary memory 172 (i.e., fast random access memory) and secondary memory 174 (typically disk storage), a user interface 176, and an Internet interface 178 for communication with the information server 104 via the Internet 119. In this document, whenever the phrase "clicking on X" is used, that phrase means a subscriber selecting the X image on a display device by positioning a pointer image over the X image, using the subscriber computer's, mouse or trackball device, and then depressing a button or key to indicate selection of the X image.

An administration manager 180 schedules and controls all communications with the information server 104. The administration manager 180 includes a connection scheduler 181 that initiates the execution of a connection manager 182 that handles communications with the information server as well as the integration of information and software procedures received from the information server into the information and software procedures stored in the client computer.

The workstation's secondary memory is used to store a local information database 184 that includes news stories 183, advertisements 188, images 190 and display scripts 192. In each case the workstation's secondary memory stores at least a subset of the corresponding items stored in the information server 104. The amount of information stored in the workstation's secondary memory depends on the amount of secondary memory available for storing such information, as well as a user profile 194 for the subscriber that indicates which categories and subcategories of news stories are of interest to the subscriber.

Figure 5:
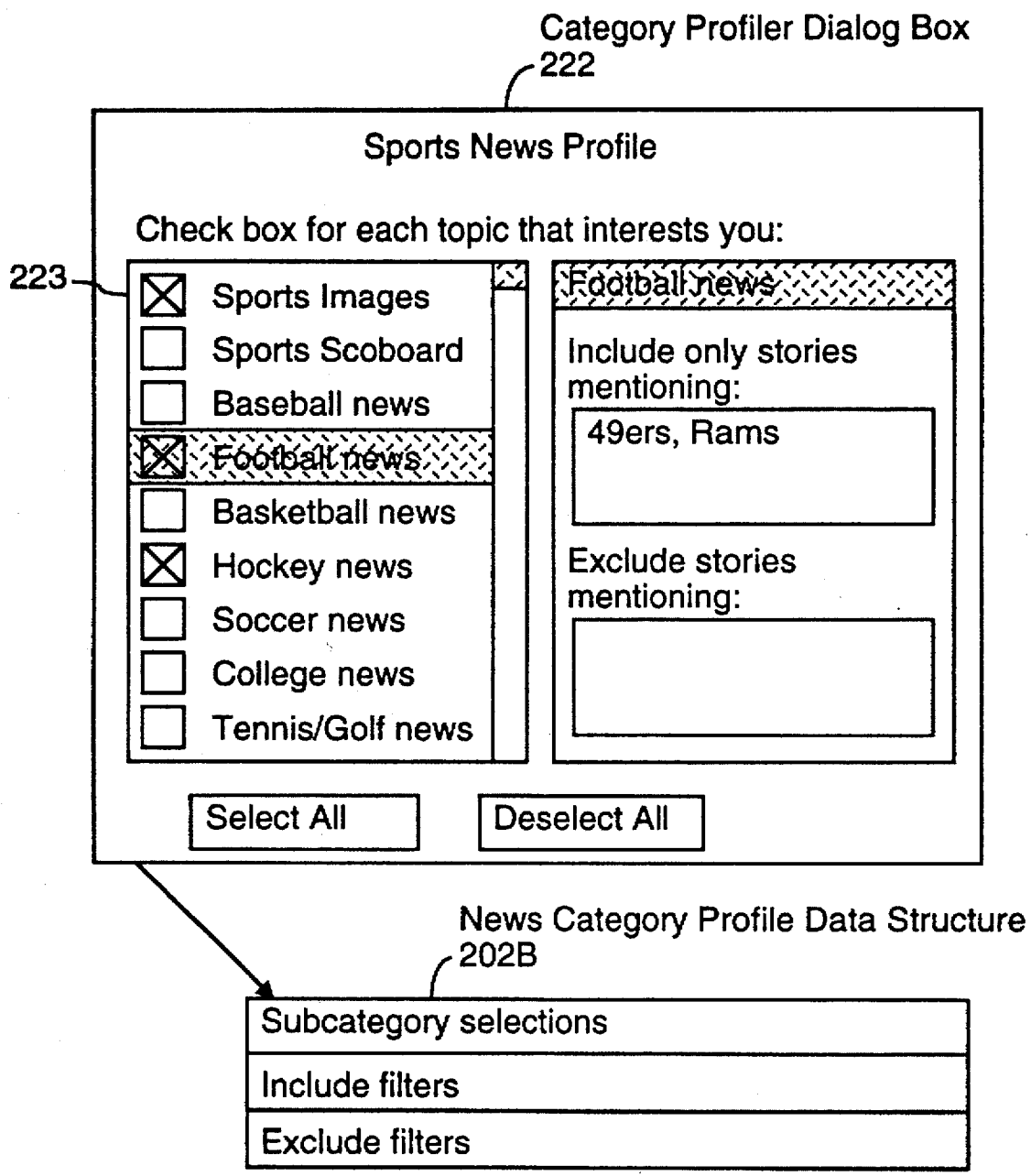
FIG. 5 schematically depicts the dialog box used to define the user profile for one information category.
Figure 6:
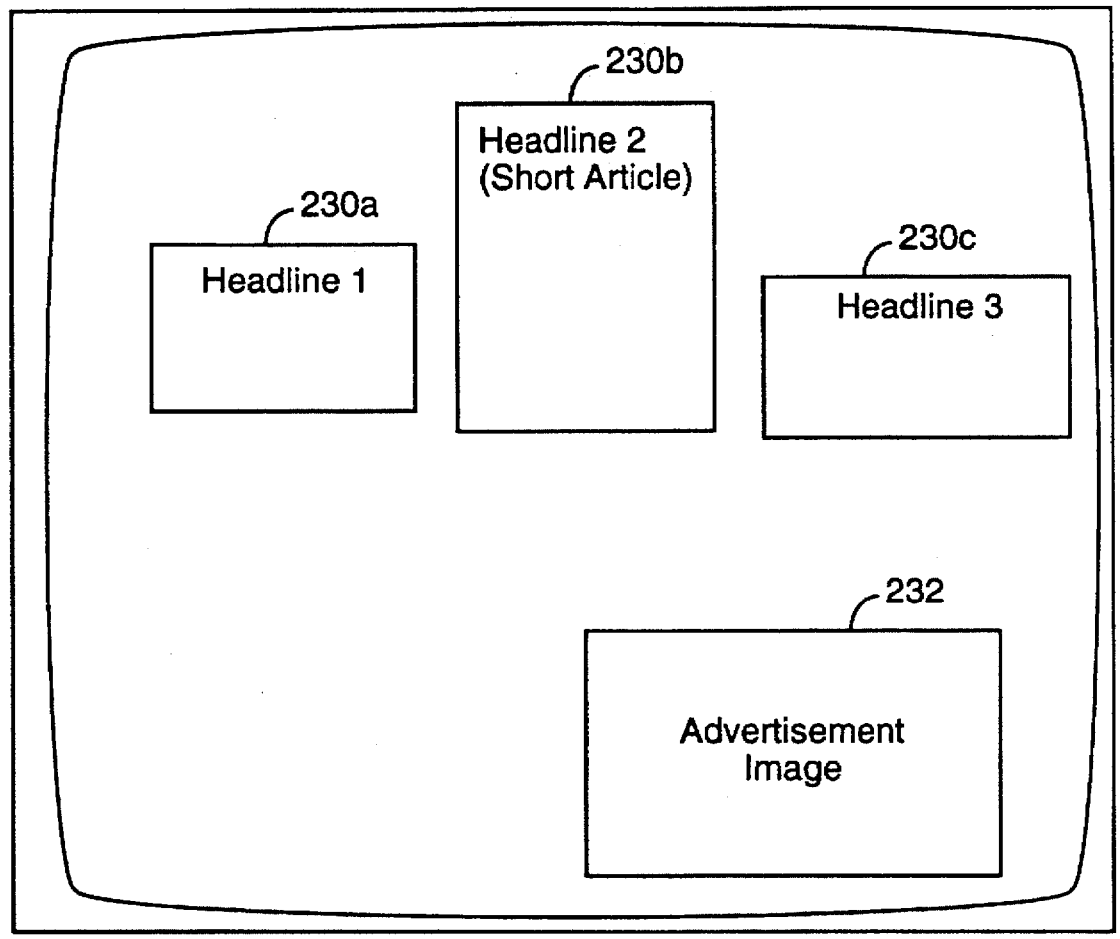
FIG. 6 schematically depicts display generated on a subscriber's display device using the screen saver procedure in a preferred embodiment of the present invention.

Data Access Tables 186, which are discussed in more detail below with reference to FIGS. 5 and 6, are used to access news stories, advertisements and display scripts associated with each of the categories of news items that are to be displayed on the subscriber's workstation.

Screen Saver and Viewer Procedures 200 are a set of procedures for controlling the display of news stories and advertisements. These procedures include a main screen saver procedure 201, category managers 202, an animation engine 204, a profiler 206, a data viewer 208 and an advertisement display statistics generator 210.

Each of the category managers 202 is a collection of programs and data associated with particular information categories. In the preferred embodiment there is a separate category manager for each information category, although in some cases it may be more efficient to use the same category manager for two or more information categories.

Figure 3:
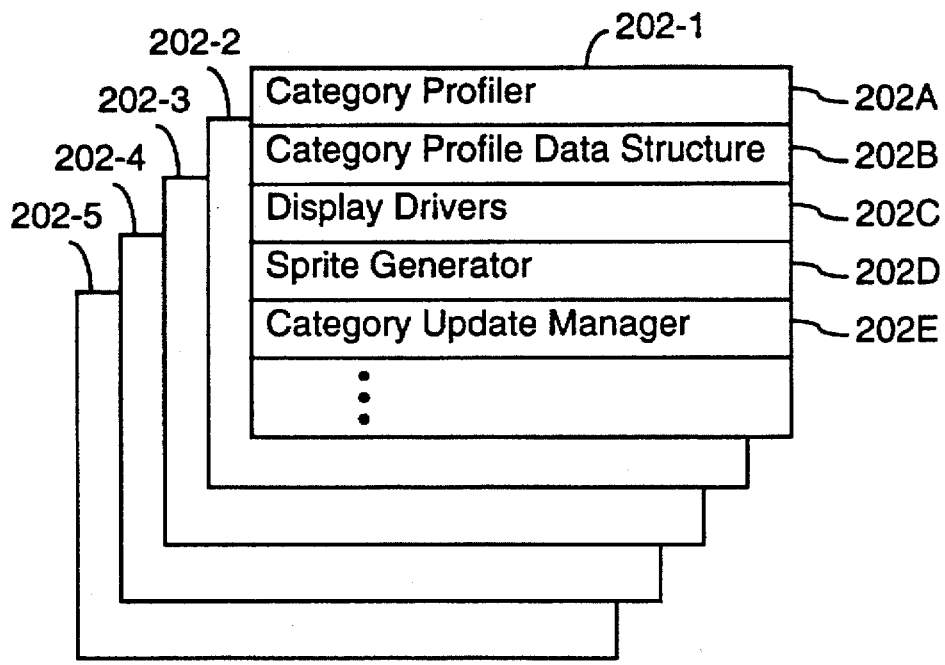
FIG. 3 schematically depicts the procedures and data structures in a set of category managers.

Referring to FIG. 3, each category manager 202 includes a category profiler 202A, a category profile data structure 202B, one or more display drivers 202C for viewing items in the corresponding information category with the data viewer, a sprite generator 202D generating images displayed by the screen saver procedure, and an update manager 202E.

The category profiler in each category presents a category profile dialog to the subscriber to determine the subscriber's interest in receiving information relating to particular subcategories. Subcategories may relate to specific companies, geographic regions, specific sports and sports teams, and so on, depending on the category. The result of the decisions made by the subscriber during the category profile dialog is stored as a category profile data structure.

The update manager in each category handles the process of updating the local information database with new items from the information server for that information category as well as the deletion of all items and the rebuilding of the portion of the data access tables used to control access to the information items, advertisements and display scripts in that information category.

The display drivers in each category manager are customized to generate images specifically needed in the corresponding categories. For instance, in the category manager for the sports category, the display driver includes instructions for generating a simulated scoreboard which is automatically updated every few seconds to show a sequence of game scores or contest outcomes in various sporting events. In another example, the display driver for the weather category includes instructions specifically designed for efficiently displaying weather maps and other weather information.

Referring once again to FIG. 2, the animation engine 204 interprets a currently selected display script and controls the display of a selected set of news stories and an advertisement in accordance with the instructions in the currently selected display script.

Figure 4:
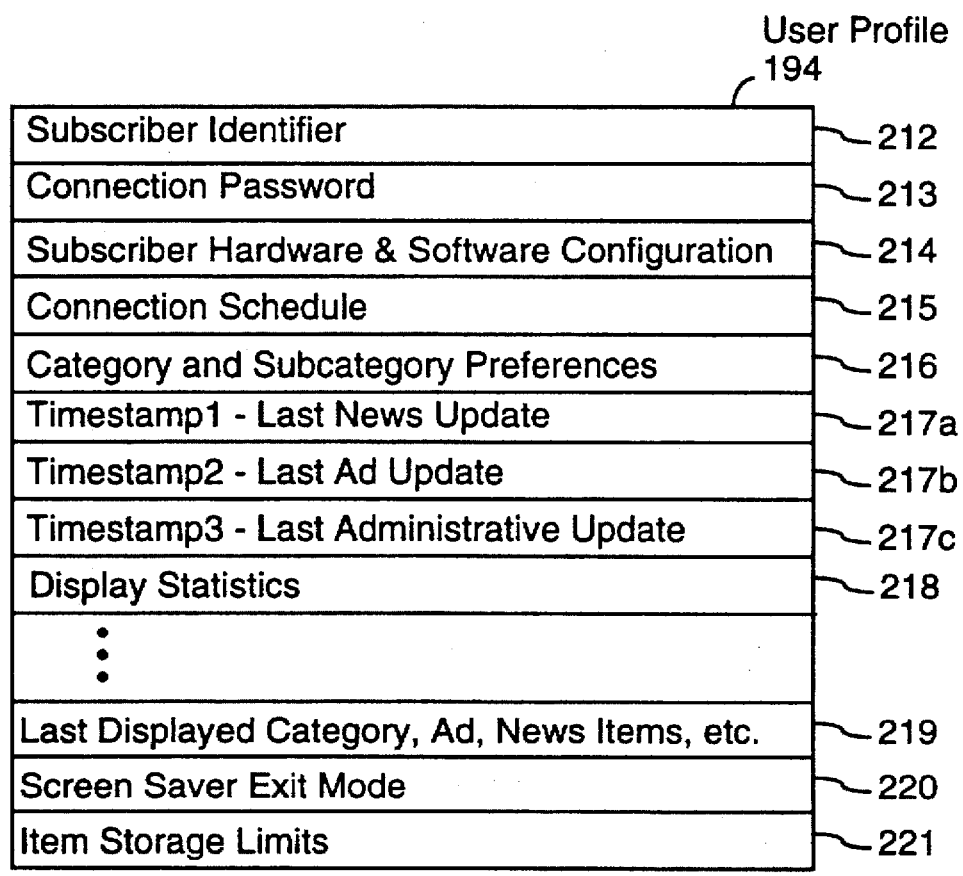
FIG. 4 schematically depicts a user profile data structure stored in a subscriber's computer to store status and configuration information for a particular subscriber and workstation.

The profiler 206 is actually a set of procedures that define and update the subscriber's user profile 194. Referring to FIG. 4, in the preferred embodiment, the user profile 194 includes:

- a subscriber identifier 212;
- a connection password 213 used in conjunction with the subscriber identifier when connecting to the information server to identify the calling computer as a registered subscriber;
- subscriber hardware and software configuration information 214 that identifies for the information server hardware and software information needed to determine the type of software and image files that are compatible with the subscriber's computer;
- a connection schedule 215 that specifies to the connection scheduler 181 within the administrative manager 180 how often the subscriber's computer should connect to the information server 104 to update its information database 184;
- category and subcategory preferences information 216 that identifies categories and subcategories of news stories that the subscriber does not want to view, as well as a list of "special categories" of news stories of special interest to the subscriber which override any categories noted as not being of interest to the subscriber;
- timestamps 217a–217c indicating the time of the last updates to the subscriber computer's locally stored set of news stories, advertisements and administrative files (including scripts, images and software modules);
- advertising and news item display statistics 218;
- screen saver information 219 indicating the last displayed information category and the last displayed advertisement and news items in each information category are stored in a portion of the user profile 194 not transmitted to the information server; and
- a screen saver exit mode indicator 220, indicating what actions cause the screen saver procedure to terminate and what actions cause the data viewer 208 to be executed.

The default connection schedule is for the subscriber's computer to initiate a connection to the information server once during the middle of the night (e.g., a randomly selected time between 11 p.m. and 7 a.m. local time) for an "administrative update," and once every four hours during the rest of the day for "news story updates." During the administrative update connection, the set of advertisements, scripts and images in the subscriber computer's local information database are updated as necessary, and any software upgrades are also downloaded onto the subscriber's computer. During both "administrative update" and "news story update" connections, the news stories in the subscriber computer's local information database are updated. At the option of the information server's system operator, script and/or software updates can be made during "news story update" connections, especially when a malfunction has been detected in previously distributed scripts or software.

In one preferred embodiment, the profiler 206 can be used to specify a connection schedule other than the default schedule. For instance, if the subscriber's computer is typically turned off at night, the administrative update connection may be scheduled to occur (A) during the subscriber's typical lunch time, or (B) once per day when the subscriber's computer has not received any user input for a specified minimum period of time (e.g., ten minutes) that indicates the subscriber is away from his/her computer.

The downloading of advertisements (which are typically images), fixed images used by display scripts, and software modules is preferably performed during the night or long periods of user inactivity because images and software modules are typically much larger than the news items, which are primarily text data. Images, including advertisements, and software modules are compressed using well known data compression techniques to make the download transmissions as time efficient as possible. Even so, downloading images is a time consuming process. For instance, downloading two high resolution advertisement images having pixel sizes of, say, 400×300 pixels each, even when using data compression, will typically take over two minutes using conventional 14.4 K baud modems. By way of contrast, downloading a dozen news stories and corresponding database base update instructions will typically take less than fifteen seconds of connection time using conventional 14.4 K baud modems. Therefore, updating the local database's set of news items can be accomplished relatively unobtrusively even while the subscriber is using his/her workstation, while updates to the advertisements and fixed images in the local database take longer and are therefore more intrusive.

It is noted that the secondary portions of news items can also include images, such as photographs that accompany the text of a news story. The transmission of such news story images can significantly increase the amount of connection time required for news item updates, and thus most news stories in the preferred embodiment do not use images, and every effort is made to transmit those news stories that have images to subscribers' computers during the overnight administrative update rather than during the daytime news item updates.

The data viewer 208 is a program for viewing news items that the subscriber specifically wants to read. The data viewer 208 can be executed at the subscriber's explicit command, and can also be launched from the screen saver if the, user indicates he/she wants to read a news story shown in the screen saver display. This is explained in more detail below.

The display statistics generator 210 keeps tracks of how many times each advertisement in the local information database has been displayed since the last time advertisement display statistics have been transferred to the information server. The display statistics generator 210 also keeps track of how many times each news item has been displayed in the same time period. These display statistics are stored in the user profile 194 at 218. In the preferred embodiment, the advertisement display statistics, and news items display statistics, are transferred to the information server once per day during a connection also used to update the subscriber computer's information database. In alternate embodiments, the advertisement display statistics could be transferred more often (e.g., every time the subscriber's computer connects to the information server) or less often (e.g., once per week).

Category Profiler Dialog

As mentioned earlier, each of the category managers includes a profiler procedure for defining the subscriber's interest in receiving news items within each information category. An example of the profile definition dialog generated by a category profiler, for the Sports category, is shown in FIG. 5. In this example, the Sports Definition Profile dialog box 222 includes, on the left side, a scroll box 223 in which the user can select and deselect subcategories of sports information by clicking on boxes next to the listed subcategories. A "Select All" button in the dialog box can be used (i.e., by clicking the subscriber computer's mouse or trackball device on the image of the box) to select all subcategories, and a "Deselect All" button can be used to indicate that the subscriber does not want to receive any news items for the Sports category. For each subcategory, either an "include only" or an "exclude" filter (but not both) can be defined where the user types in key words to be used to select (for the include only) or deselect news items within that subcategory. For instance, if the subscriber types in the words "49ers, Rams" in the box for the include only filter for the "football news" subcategory, only news items using either of those words will be shown to the subscriber.

The category manager profile procedure generates a category profile data structure 202B that represents the subcategories of interest to the subscriber as well as any associated filters that have been defined.

Display Script Definition Procedure

Referring to FIG. 6, there is shown in outline form a snapshot of typical display generated by the screen saver procedure of the present invention. On this particular exemplary display are shown three news story "headlines" 230a–232c and one advertisement image 232. Each of the headlines 230 is an image representing the text of the "primary component" of a news items, as explained above. While the image shown in FIG. 6 appears static, in the preferred embodiment the display script that controls the display of the headlines and advertisement can and most often does contain instructions for continuously moving the headline images around the screen.

The display scripts also mix fixed images with the headline images to create varied and interesting displays. In one example of a display script, cartoon characters appear to move the headlines around. In another example of display script, the background behind and surrounding the headlines is a sequence of fixed images such as pictures of peaceful landscapes, while the headlines gently float around the portions of the display not occupied by the advertisement image 232.

Figure 7A:
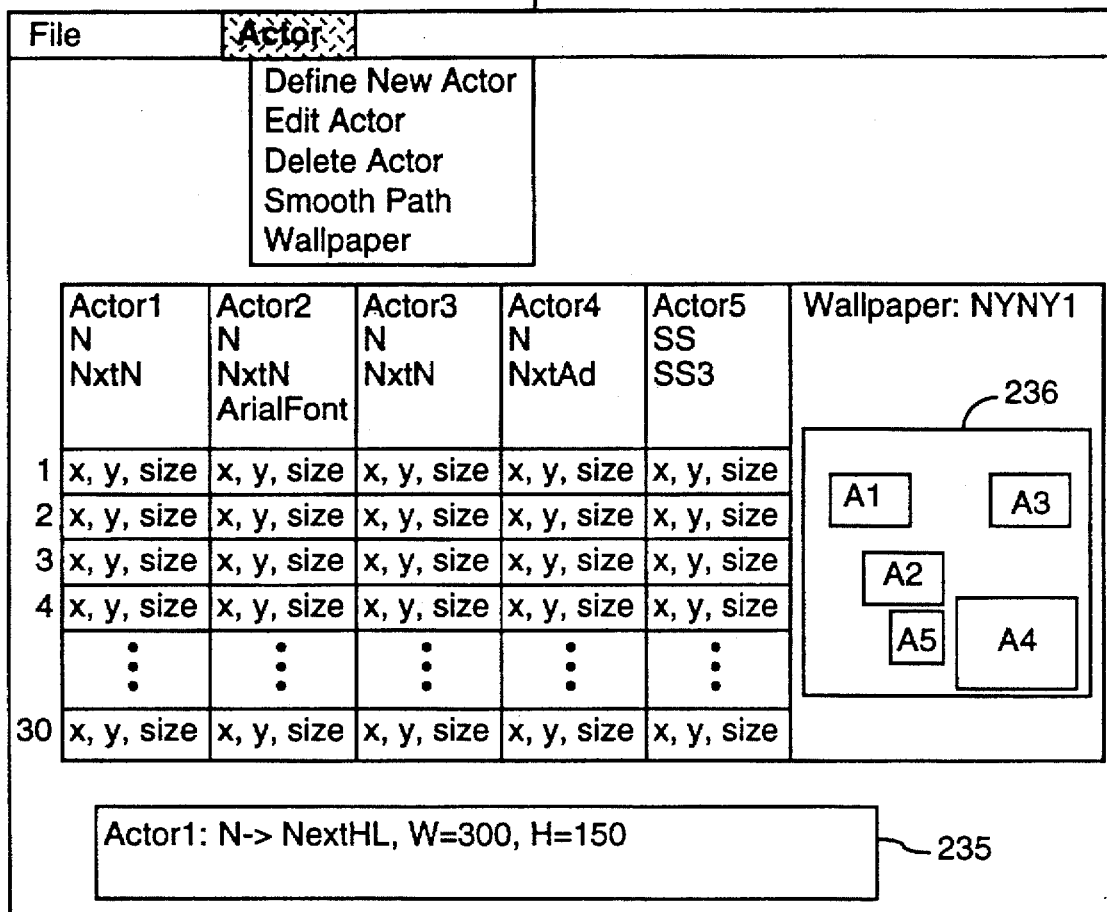
FIGS. 7A and 7B schematically depicts the dialog box used to define a display script and the resulting data structure.
Figure 7A:
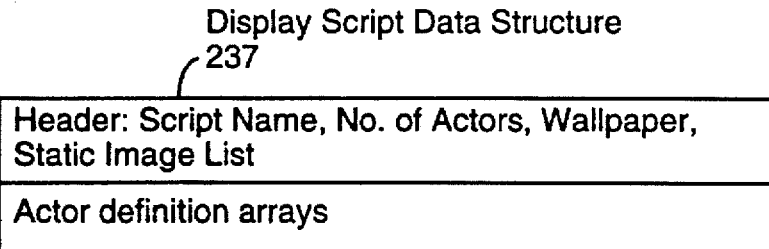

Referring to FIG. 7A, the preferred embodiment provides an easy to use dialog 234 for display script definition. A display script consists of definitions for two or more actors, plus an optional definition of a background image, called the wallpaper image. Each "actor" represents a sprite, which is a displayable image, that can move around the screen and whose size can vary dynamically. An new actor is initially defined by selecting the "new actor" command in the Actor menu, as shown in FIG. 7A, and then entering a text string (shown in box 235) that specifies (A) the sprite generator procedure to use to generate the image for the actor, (B) the source of the information to be displayed, (C) the nominal width and height of the sprite (e.g., in units of pixels), and (D) any optional parameters that are specific to the specified sprite generator (e.g., a font may be specified for the News information category's sprite generator, whereas a font designation parameter may be meaningless for other ones of the sprite generators).

In the preferred embodiment, the specified sprite generator must be either the static sprite generator that is part of the animation engine 204, or is any specified one of the sprite generators 202D in the category managers 202. In an alternate embodiment, additional sprite generators may be provided by the animation engine 204, such as an animated sprite generator for successively displaying a sequence of images to simulate a motion. The source of information to be displayed is either a static image, in the case of the static sprite generator, or information items in a specified information category. For instance, the parameter "NextilL" in an actor definition indicates that the information to be displayed in the corresponding sprite is the next headline in the information category corresponding to the specified sprite generator for the actor. In another example, the parameter "NextAd" in an actor definition indicates that the information to be displayed in the corresponding sprite is the next advertisement image for the information category corresponding to the specified sprite generator for the actor.

The second stage of defining a sprite is to define its position and size at one second intervals, for 30 seconds in the preferred embodiment. The position of the sprite for a particular time can be defined by either typing in an X,Y, or by selecting a box representing the sprite with the user interface and then moving it to a position on a simulated display screen 236. The size specification for the sprite at each time is a percentage of the sprite's nominal size (e.g., "size=120" indicates the sprite is to be displayed at 120% of its nominal size). The full definition for a sprite includes thirty X,Y,size tuples for a thirty second screen saver display period. In a typical display script, nor more than one advertisement, three news items and two static images are used because the resulting display will be excessively busy, although the display script definition procedure allows a virtually unlimited number of sprites to be specified.

The data structure 237 representing each display script is shown in FIG. 7A: a header specifying the script's name, the number of actors defined in the script, an optional Wallpaper definition, and a list of all static images referenced by the script; plus a set of Actor definition arrays.

The screen save procedures interpret each display script and generate an animated display for 30 seconds based on the script. During display, the image corresponding to each actor is moved and sized in a virtually continuous manner, where the position and size of each sprite is linearly interpolated between the instantaneous position and size specifications for each second. During the display definition process, the sequence X,Y,size parameters for a currently selected actor can be smoothed, to produce more fluid movement and size changes of the actor by selecting the "smooth path" command in the Actor menu.

Figure 7B:
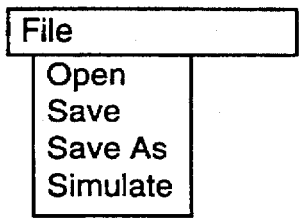

Referring to FIGS. 7A and 7B, the person preparing a display script using the display script definition dialog 234 can see the movement and sizing of the actors in the simulated display screen 236 by selecting the simulate command in the File menu, which cause the boxes in the simulated display screen 236 to move and be sized in accordance with the sequence of X,Y,size parameters for each specified actor.

While in the preferred embodiment advertisements are always simultaneously displayed with news items, in other embodiments advertisements and news items could be displayed sequentially. Computer programmers of ordinary skill in the art could modify the script definition dialog of the preferred embodiment, as described above, to define display scripts with sequential display of advertisements and news items.

Screen Saver Procedures

In the preferred embodiment, the screen saver procedures for displaying news items and advertisements are invoked using the same types of criteria as are used by other types of screen saver procedures. Generally, whenever the system detects a lack of user inputs via either keyboard or pointer device (e.g., a mouse or trackball) for a user configurable or otherwise specified length of time (e.g., 5 minutes), the screen saver procedures of the present invention begin the display of news items and advertisements from the local information database. In the preferred embodiment, the screen saver procedures display news items and advertisements for a sequence of information categories in a sequence of 30 second time slots.

More specifically, under the control of the screen saver procedures, news stories and an advertisement assigned to a first information category are displayed using a first display script for 30 seconds, then news stories and an advertisement assigned to a second information category are displayed using a second display script for the next 30 seconds, and so on until news stories and an advertisement have been displayed in all the information categories indicated in the subscriber's user profile 194 as being of interest to the subscriber, at which point the process repeats with the first information category.

Figure 8:
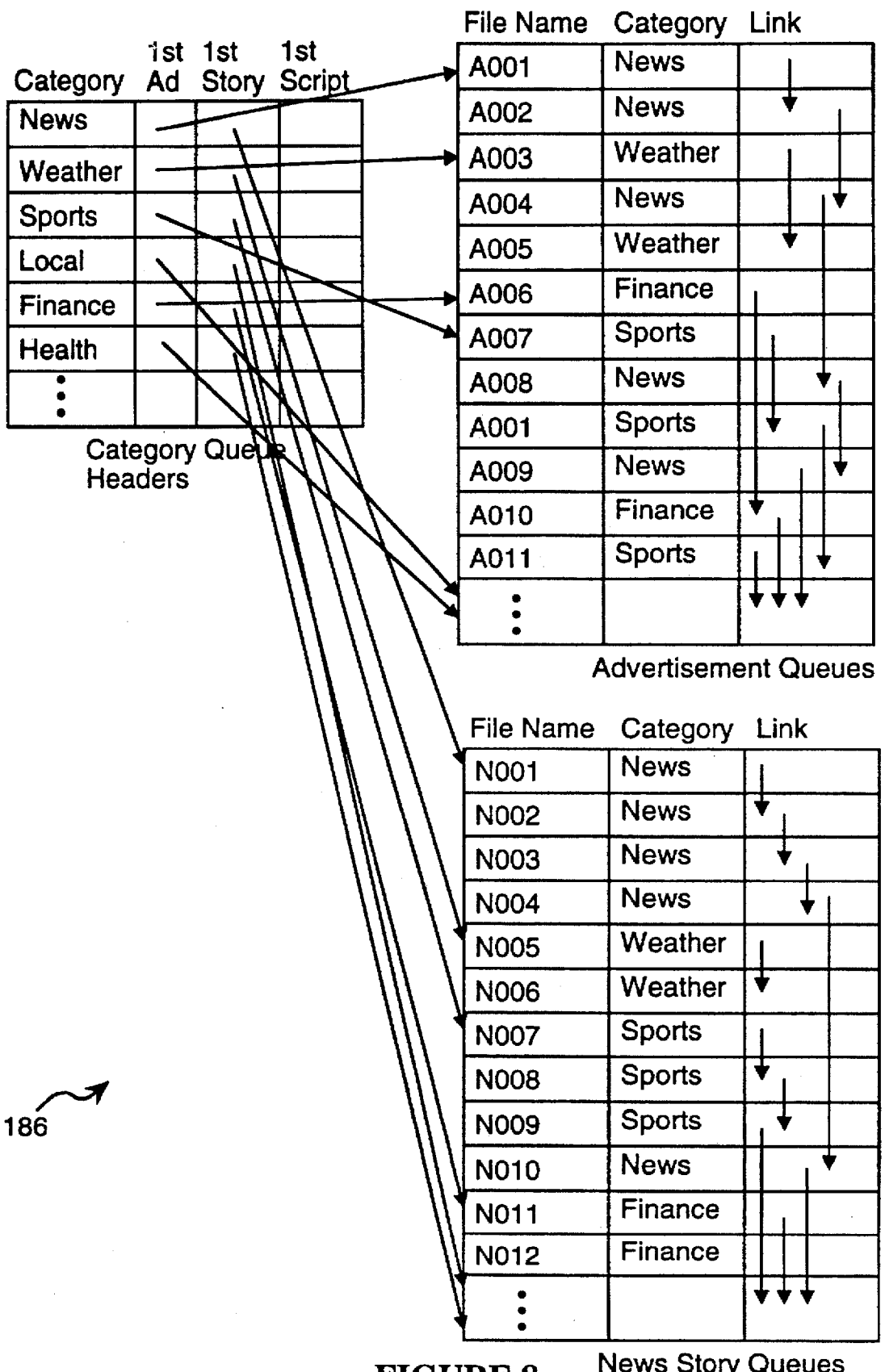
FIG. 8 and 9 schematically depict data structures stored in a subscriber's computer to indicate advertisements and news stories available for display in various information categories.

Referring to FIG. 8, news stories, advertisements and display scripts are stored in files or similar data structures which have assigned unique file names. Each news story (herein usually called a news item) is usually assigned to a single information category, although nothing in the system of the preferred embodiment would prevent a news story from being assigned to multiple information categories. Advertisements can be assigned to multiple information categories as can display scripts.

Figure 9:
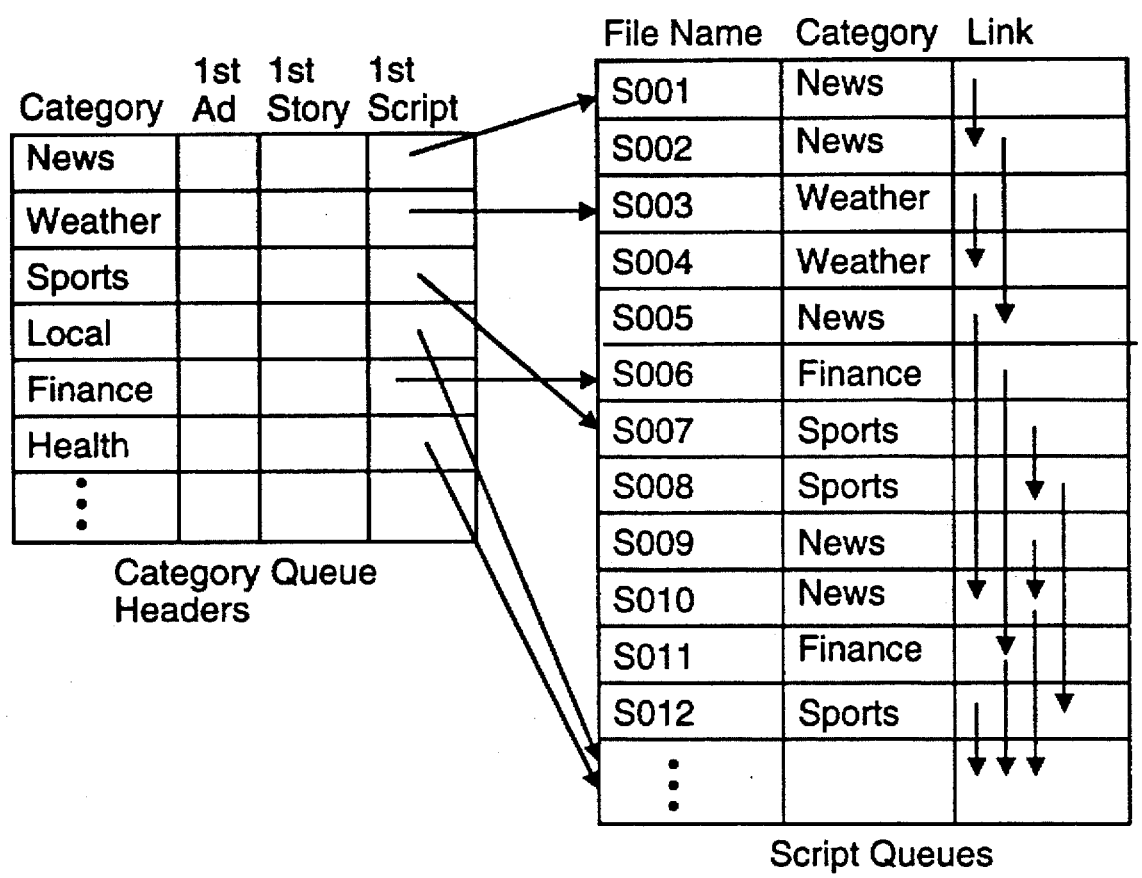

As shown in FIGS. 8 and 9, the advertisements assigned to each information category are organized, through the use of a set of data access tables 186, in a separate linked list so as to create a separate "queue" of advertisements for each information category. Similarly the news items and display scripts assigned to each information category are organized in separate linked lists so as to generate separate queues of news items and display scripts for each information category.

FIG. 8 includes an example of an advertisement (A001) assigned to two information categories (News and Sports). This advertisement is stored only once in the workstation's local hard disk, but is included in two of the linked lists of advertisements.

The basic procedure for determining what display script, advertisement and news stories to display during each 30 second time slot is shown in pseudocode form in Table 1.

TABLE 1

Pseudocode Representation of Screen Saver Procedure

Store, indication of last information category displayed, and for each category an indication of the last advertisement, news story and display script used.
Do Until Screen Saver Mode is exited:
{
  Select next information category (SIC).
  Select next display script (SDS) from queue of display scripts and next advertisement (SA) from queue of advertisements for the selected information category.
  Inspect selected display script to determine NN, the number of news items to be displayed. Select the NN next news items (SNI) from queue of news items for the selected information category.
  Update User Profile to indicate the last selected information category, and to indicate for the selected information category, the selected display script, advertisement and last selected news story.
  Call Animation Engine (SDS, SA, SNI) to display for the next 30 seconds the selected advertisement (SA) and news items (SNI) under the direction of the selected display script (SDS).
  Call Ad Display Statistics Generator to update displayed advertisement statistics to include the advertisement displayed during current screen saver display period.
}

Each time the Screen Saver procedure 201 is invoked, it starts with the next information category after the last one to have been used, and starts with the next advertisement and news stories after the last ones used in that information category. The screen saver status information 219 indicating the last displayed information category and the last displayed advertisement and news items in each information category are stored in a portion of the user profile 194 not transmitted to the information server.

Execution of the Screen Saver procedure 201, like other screen savers, is terminated and the subscriber's computer's display is returned to whatever was being displayed before the Screen Saver was executed, upon detection of certain types of user input. In the preferred embodiment, the user can use the profiler to select one of at least two exit modes: in a first mode, the Screen Saver procedure is terminated by hitting any key on the subscriber computer's user interface keyboard or by moving the user interface's mouse or trackball; in a second mode, the Screen Saver procedure is terminated by hitting any key on the subscriber computer's user interface keyboard, but movement of the mouse or trackball does not cause the Screen Saver procedure to terminate. Rather, in the second screen saver exit mode, the subscriber can use the mouse or trackball to point to any of the news items being displayed and upon clicking one of the mouse or trackball's buttons, the data viewer 208 is executed with the news item selected by the subscriber being displayed.

When using the second screen saver exit mode, if subscriber user clicks on an advertisement, the subscriber's computer is automatically connected to the an associated World Wide Web page on the Internet that provides additional information from the advertiser. This is accomplished by World Wide Web connection and viewer procedures 211 (see FIG. 2) stored on subscriber's computer. Each advertisement is stored on both the information server and subscriber computers as a C++ data structure that includes (A) an image data array, typically representing a "GIF" format image, as well as (B) a list of static images (such as corporate logos and legends), if any, incorporated into the advertisement, and (C) a Web site address that is used by the World Wide Web connection and viewer procedures 211 to connect the subscriber to the advertiser's specified Web page when the subscriber clicks on the image of the associated advertisement.

Data Viewer

Figure 10:
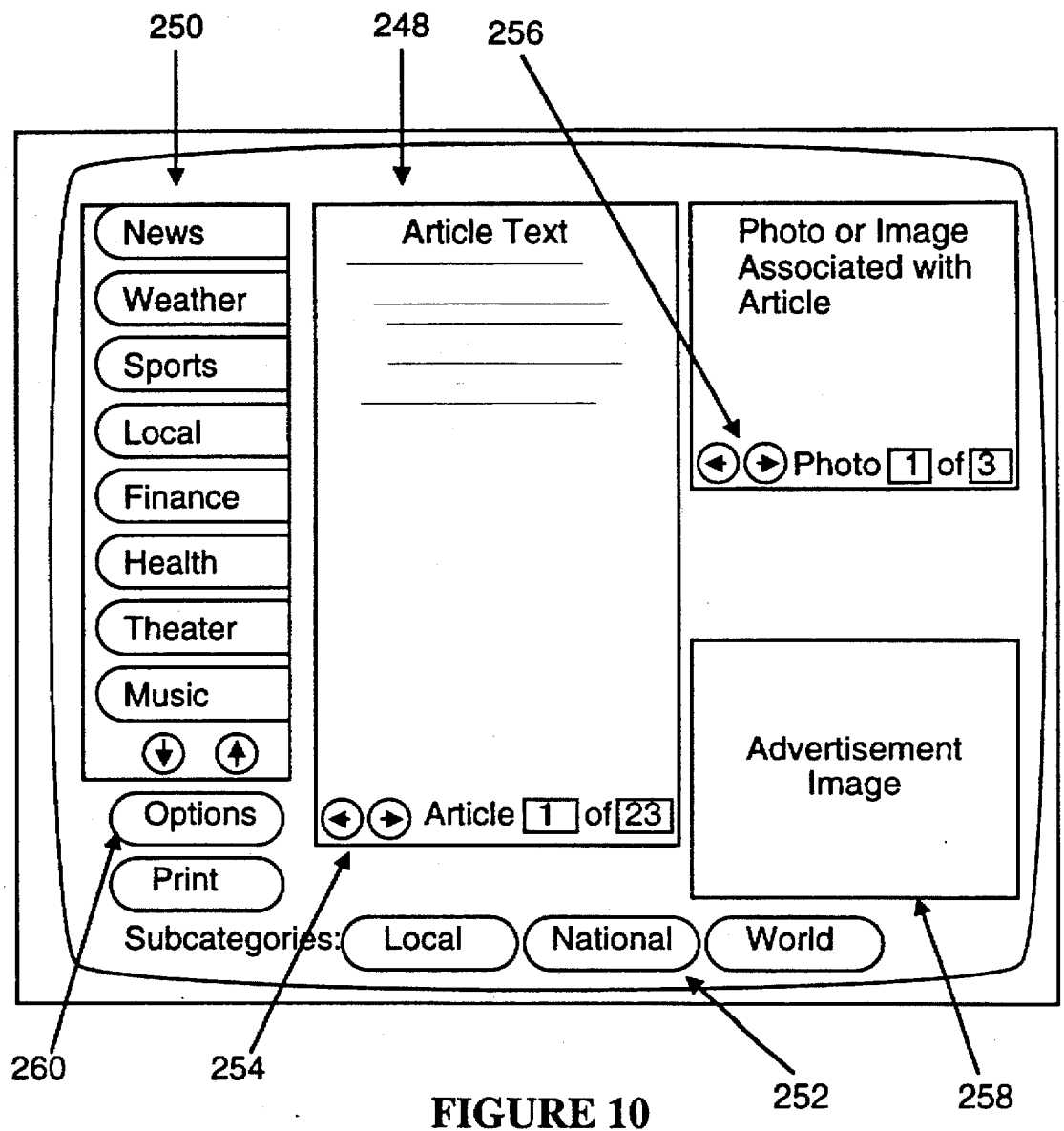
FIG. 10 schematically depicts a display generated on a subscriber's display device using a data viewer procedure in a preferred embodiment of the present invention.

Referring to FIG. 10, the data viewer 208 is a program for viewing news items that the subscriber specifically wants to read. The data viewer 208 can be executed at the subscriber's explicit command, and as just described in the immediately preceding section of this document, the data viewer can also be launched from the screen saver when the subscriber indicates that he/she wants to read a news story shown in the screen saver display by "clicking" the subscriber's computer's mouse or trackball on that news story.

The news stories shown in the center section 248 of the data viewer's display is selected by first selecting an information category by clicking on any of the category buttons 250 on the left margin of the display, and a subcategory button 252, if any, on the bottom margin of the display, and then clicking on the article advance backward and forward buttons 254 to scroll through the news items in the selected information category. When a news item has more than one photo image associated with it, the subscriber can click on the photo advance backward and forward buttons 256 to scroll through the photos.

Each news item displayed in the center section 248 of the data viewer's display includes both the primary and secondary portions of the news item, thereby providing the subscriber in most instances with access to a fuller version of the news item than was shown by the screen saver. In the case of very short news items, the entire news item may be contained in its primary component. Furthermore, in client computers with very limited hard disk space available for storing news items, as indicated by the user profile 194 for the client computer, the secondary component of news items may not be stored in the local information database in order to conserve disk space.

A portion of the data viewer screen is always occupied by an advertisement image 258. The advertisement image shown is selected on the basis of the information category associated with the news item being viewed. In a preferred embodiment, the advertisement shown in the data viewer screen is changed (A) every time the subscriber clicks on a category button 250 so as to select a different information category than the one previously selected, and (B) every 30 seconds when subscriber continues to view news items in a single information category for more than 30 seconds. The advertisements are selected in rotating order among the advertisements assigned to each information category, as described above for the screen saver procedure.

When using the data viewer, if subscriber user clicks on the displayed advertisement, the subscriber's computer is automatically connected to the an associated World Wide Web page on the Internet that provides additional information from the advertiser.

The Options button 260 is used to invoke dialog procedures in which the subscriber specifies general preferences, such as how quickly data scrolls in the scrolling windows, and which mode of screen-saver termination the subscriber prefers.

Connecting the Subscriber's Computer to the Information Server

Figure 11:
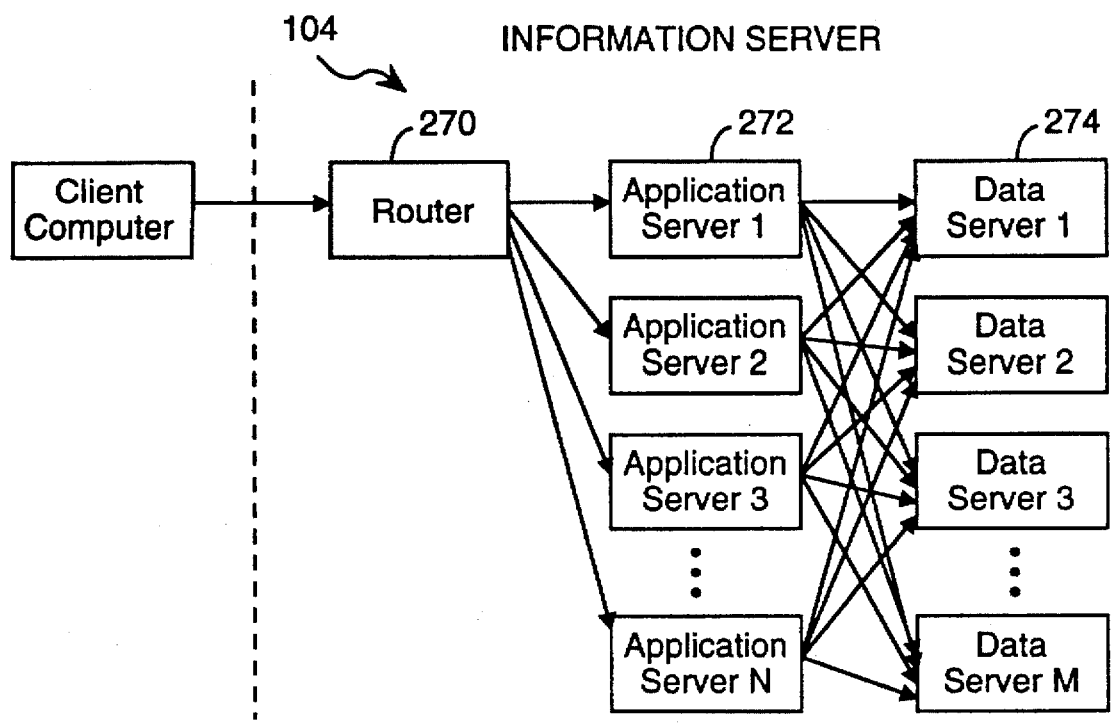
FIG. 11 depicts the relationships between various processes in the information server.
Figure 12:
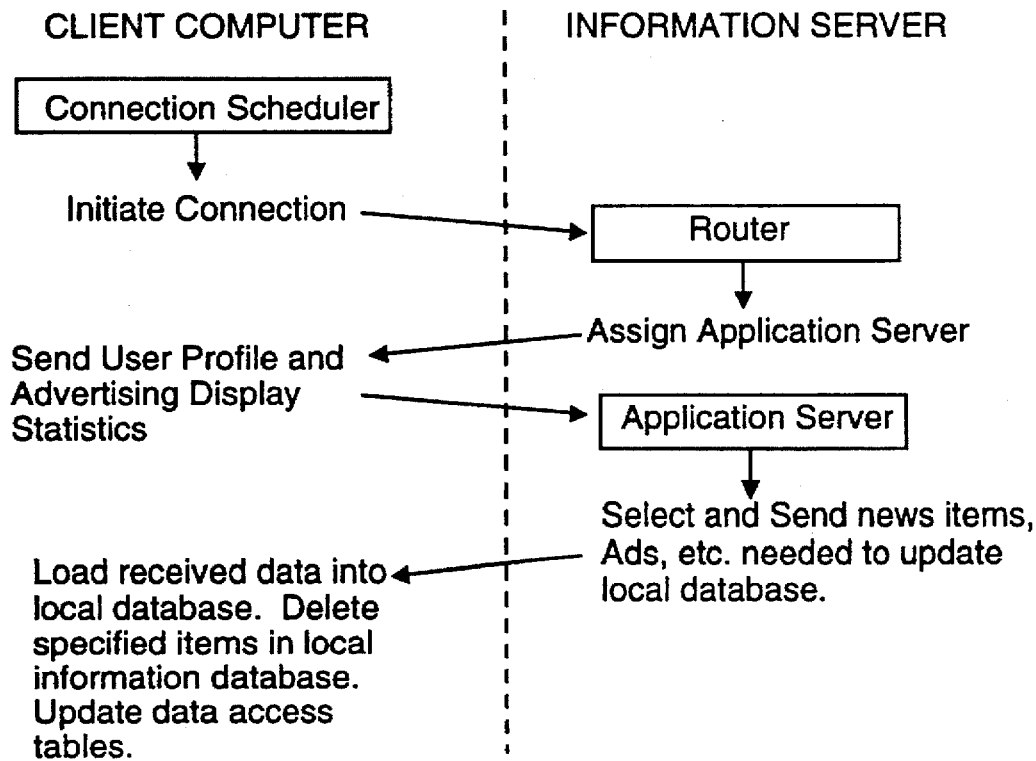
FIG. 12 is a flow chart depicting the procedure for updating the local database and software modules of a subscriber's computer.

Referring to FIGS. 11 and 12, the information server is preferably a set of computers interconnected by a local area network that each operate under a multi-tasking, multi-threading operating system such as Microsoft's Windows NT. The information server 104 has multiple "application servers" 272, which are processes run on one or more computers. Each application server 272 preferably has multiple threads, each of which can service one connection with a client computer at any one time.

A primary concern with the architecture of the information server is that the information be able to handle a very large volume of connection requests from client computers. The information server may need to service thousands of connection requests per hour, and thus efficient handling of each connection request is important.

In a preferred embodiment, during each connection of a subscriber computer to the information server, the information server sends a "next recommended download time" to the subscriber computer along with the other information being downloaded onto the subscriber computer. The server computer selects the next recommended download times sent to the various subscriber computers so as to spread their connection requests fairly evenly over time. In an alternate embodiment, connection requests are spread over time by having the subscriber computers randomly select connection times within the general boundaries of a specified schedule of connections (e.g., a randomly selected time anywhere within a half hour, plus or minus, of each scheduled connection time).

When a client computer first initiates a connection to the information server, it sends a first message to the Internet address associated with a router process 270 in the information server. The router selects an application server 272 with at least one available thread and passes back to the client computer an Internet address associated with that application server.

The client computer then sends a portion of its user profile to the assigned application server. If an administrative update is being requested, the locally accumulated advertising display statistics 218 (see FIG. 4) are also sent to the application server.

Based on the time of day and the information in the transmitted user profile, the application server determines (A) what type of update is to be performed (i.e., a news item update or an administrative update), and (B) what new information needs to be downloaded to the client computer and what items in the client computer's local information database should be deleted. The application server 272 then makes calls to one or more data servers 274 to collect all the information that needs to be sent to the client computer and then sends those items to the client computer, along with instructions on what items, if any, should be deleted from the client computer's local information database.

The client computer then loads the received information into its local database, and replaces software modules with received software modules, if any. It also deletes the items, if any, specified for deletion by the information server. Finally, it updates its data access tables 186 to incorporate all the changes to the information database so that the client computer is ready to display news items and advertisements in each information category.

A more detailed explanation of the local database update process is provided by a pseudocode representation of that process in Table 2.

In one preferred embodiment, when the "client" that is connected to the information server for an update is itself a local area network server, the client downloads all news items into its local database. In a second preferred embodiment, the client/LAN server generates a group profile that represents the union of all news category and subcategory preferences of the subscribers connected to the client computer, and news items are downloaded into the client's local database based on that union group profile. In either embodiment, the screen saver procedures filter out news items in the LAN server's local information database that are not consistent with each subscriber's user profile, thereby showing each subscriber only the subset of news items corresponding to the subscriber's user profile. In the preferred embodiments, the subscriber level news item filtering is accomplished by setting up the subscriber's data access tables 186 to include only news items corresponding to the subscriber's user profile. In the computers of stand alone subscribers, the filtering of news stories is handled during the data download process, by only downloading news items corresponding to the subscriber's user profile.

The subscriber level news item filtering function is also used to enable the information server to instruct the subscribers' computers to "black out" an advertisement, without deleting it from the local database. For example, a company may want to suspend its advertisements for a few days after a disaster involving the company. The black out function is achieved by simply removing the corresponding advertisement(s) from the advertisement queues in the data access tables. For this purpose, the information server and subscriber computers may temporarily define a "non-use" information category and a corresponding advertisement queue for keeping track of blacked out items.

TABLE 2

Pseudocode Representation of Database Update Procedure

Connect to Information Server
If Update Type=Administrative /* i.e., not a news story only update */
{
   Client sends display statistics to server, and clears display statistics
      upon confirmation that server has successfully received them
   /* Pool Synchronization */
   Server Sends list of items (i.e., advertisement and scripts) that
      should be included in the client's advertisement and script pools
   Client deletes items in its advertisement and script pools that are not
      included in the list received from the Server
   Client determines what items are missing from its advertisement and
      script pools TABLE 2-continued Pseudocode Representation of Database Update Procedure Client sends requests to Server for advertisements and scripts
      determined to be missing from local pools
   Server sends requested items to Client
   Client stores received advertisements and scripts in their
      respective disk directories
   Client opens all advertisement and script files to determine the static
      images referenced by those files, but not included in the local
      static image pool.
   Client sends requests to Server for static images determined to be
      missing from local pool
   Server sends requested items to Client
   Client stores received static images in their assigned disk directory
   /* Software Module Synchronization */
   Client sends message indicate it is ready for software
      synchronization, including date and time of last
      administrative update
   Server sends new software modules, if any, based on date and time of
      last administrative update
}
For each Category Manager (CMx)
{
   /* CMx.Fetch Procedure: */
   Client (CMx.Fetch procedure) sends profile data for CMx to Server,
      including subcategory data and filter data, if any
   Server sends items consistent with profile data
   Client (CMx.Fetch procedure) stores received items in data structures
      and files for that category
   Client (CMx.Fetch procedure) deletes items, in FIFO order,
   for current category which (A) exceed data storage
      limit in date, (B) exceed item count limit,
      or (C) exceed specified age limit
   /* Item storage limits 221 for each category are defined in a portion
      of the user profile 194 (see FIG. 4) */
}
Client updates data access tables
Return

Alternate Embodiments and Extensions

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, in an alternate embodiment of the present invention, the server's information database 134 also includes a client catalog which lists all subscribers authorized to receive news items and advertisements from the server, including a connection password that is checked whenever the subscriber's computer calls the information server for an update, and status information included the last time that each subscriber's computer received updated news items, advertisements, scripts, and software modules.

In another alternate embodiment, the information server broadcasts information updates to all the subscriber computers, for example by sending an e-mail message or a sequence of e-mail messages containing all news item, advertising, display script and software updates to all the computers of registered subscribers.

What is claimed is:

1. A computer-implemented method of displaying information on a computer having a local storage device and a display device, the computer being coupled to a network, the computer-implemented method comprising the steps of:

storing advertising information and news information downloaded from the network in the local storage device of the computer, wherein each of the advertising information and the news information is associated with at least one category in a list of predefined categories, the list of predefined categories being based on user selected preferences;

detecting a predefined idleness criteria for the computer wherein the predefined idleness criteria is met when the computer fails to receive user input for a predetermined amount of time;

selecting a first set of advertising information and a corresponding first set of news information from a first category in the list of predefined categories; and displaying the first set of advertising information and the first set of news information in a screen saver on the display device of the computer after a predetermined period of time.

2. The computer-implemented method as recited in claim 1 wherein the step of displaying includes the steps of displaying, with continuous movement on the display device, the first set of advertising information and the first set of news information in the screen saver on the display device of the computer after a predetermined period of time.

3. The computer-implemented method as recited in claim 2 wherein the step of displaying further includes the step of displaying, with continuous movement on the display device, an image together with said first set of advertising information and the first set of news information.

4. The computer-implemented method as recited in claim 3 wherein the image is an animated character.

5. The computer-implemented method as recited in claim 1 further including the steps of:

selecting a second set of advertising information and a corresponding second set of news information from a second category in the list of predefined categories;

removing the first set of advertisement information and the first set of news information; and displaying the second set of advertisement information and the second set of news information in the screen saver on the display device of the computer after a predetermined period of time.

6. The computer-implemented method of claim 1 wherein the computer is coupled to an information server on the network, the computer-implemented method further comprising the step of periodically downloading updated advertising information and updated news information from the information server to the computer.

7. The computer-implemented method of claim 6 wherein the list of predefined categories is automatically updated based on changed information on the information server.

8. The computer-implemented method of claim 1 further comprising the steps of:

providing a plurality of display scripts in the computer; and controlling with one of the display scripts the display of the advertising information and the news information in the categories selected by the user and the display of a background image.

9. The computer-implemented method of claim 8 additionally comprising the step of rotating the plurality of display scripts to control the display of the advertising information and news information in the categories selected by the user and the display of the background images.

10. The computer-implemented method as recited in claim 1 wherein the news information comprises a primary and a secondary component.

11. The computer-implemented method as recited in claim 10 wherein the step of displaying the first set of advertisement information and the first set of news information includes the step of displaying the first set of advertisement information and the primary component of each of the first set of news information in the screen saver on the display device of the computer after a predetermined period of time.

12. The computer-implemented method as recited in claim 11 wherein said secondary component is displayed only upon user request.

13. The computer-implemented method as recited in claim 11 wherein the step of displaying is interrupted when the computer detects any user input on an input device coupled to the computer.

14. The computer-implemented method as recited in claim 11 wherein the step of displaying is interrupted when the computer detects user selection of one of the displayed advertising information and the primary portion of news information in the screen saver.

15. The computer-implemented method as recited in claim 14 wherein if the advertising information is selected, the computer further automatically connects to a Web page on the network corresponding to the selected advertising information.

16. The computer-implemented method as recited in claim 14 wherein if the primary portion of the news information is selected, the computer further automatically displays the secondary portion of the news information.

17. The computer-implemented method as recited in claim 1 wherein the network is the Internet.

18. The computer-implemented method as recited in claim 1 wherein the network is the World Wide Web.

19. The computer-implemented method as recited in claim 1 wherein the computer is a personal computer (PC).

20. The computer-implemented method as recited in claim 1 wherein the computer is any computer that supports a screen saver mode of operation.

* * * * *

UNITED STATES PATENT AND TRADEMARK OFFICE
CERTIFICATE OF CORRECTION

PATENT NO. : 5,740,549
DATED : April 14, 1998
INVENTOR(S) : Reilly et al.

It is certified that error appears in the above-identified patent and that said Letters Patent is hereby corrected as shown below:

In column 10 at line 47 delete "NextiiL" and insert --NextHL--

Signed and Sealed this

Thirteenth Day of October 1998

Attest:

BRUCE LEHMAN

Attesting Officer

Commissioner of Patents and Trademarks